(12) United States Patent
Yang

(10) Patent No.: US 7,033,220 B1
(45) Date of Patent: Apr. 25, 2006

(54) COMPACT FLUORESCENT LAMPHOLDER

(75) Inventor: Wen Ho Yang, Taipei County (TW)

(73) Assignee: Sun-Lite Sockets Industry Inc., Taoyuan (TW)

( * ) Notice: Subject to any disclaimer, the term of this patent is extended or adjusted under 35 U.S.C. 154(b) by 0 days.

(21) Appl. No.: 11/222,943

(22) Filed: Sep. 12, 2005

(51) Int. Cl.
*H01R 19/00* (2006.01)

(52) U.S. Cl. ..................... 439/617; 439/231

(58) Field of Classification Search ............... 439/617, 439/620, 231, 242, 244, 239
See application file for complete search history.

(56) References Cited

U.S. PATENT DOCUMENTS 4,879,491 A * 11/1989 Hirozumi et al. ........ 313/318.1
6,162,096 A * 12/2000 Klaus ..................... 439/617
6,382,812 B1 * 5/2002 Hsu ........................ 362/249
6,768,072 B1 * 7/2004 Yang ...................... 200/329
2003/0232540 A1 * 12/2003 Nick et al. ............... 439/617

* cited by examiner

*Primary Examiner*—Hien Vu
(74) *Attorney, Agent, or Firm*—Bacon & Thomas, PLLC

(57) ABSTRACT

A compact fluorescent lampholder includes a cap, a shell, an electric board and a base. The cap and the shell are combined together by hooking, and the electric board is combined with the base by plural pins, and then the electric board assembled together with the base is inserted in a hollow space of the shell. A compact fluorescent lamp (CFL) is to be inserted in a groove in the base. Then wires are connected properly between the electric board and electric power so as to light up a CFL fitted in the base. The shell is easily separated from the cap to fall down a little owing to some spare preset length of the wires so it is convenient to replace a CFL or to repair the socket.

3 Claims, 5 Drawing Sheets

COMPACT FLUORESCENT LAMPHOLDER

BACKGROUND OF THE INVENTION

1. Field of the Invention

This invention relates to a compact fluorescent lampholder(CFLH in short), particularly to one having a special structure of combination by inserting and hooking for convenience of assembly, maintenance and repair.

2. Description of the Prior Art

A conventional CFLH has a base to be directly fixed at a place where a CFL is installed, for example, under a ceiling plate, so a user holds a CFL and inserts it into a hole of a CFLH with much attention. Generally speaking, the conventional CFLH is fixedly assembled, impossible to be taken apart without breaking it or losing its function. So a consumer is not able to check or repair it by taking it apart in case of need, only able to replace a CFL. Moreover, the CFLH is located mostly at a high place, not to be lowered down a little in replacing an old CFL with a new one, very inconvenient to handle.

SUMMARY OF THE INVENTION

The main feature of the invention is provision of a cap, a shell, an electric board and a base for forming a CFLH. The cap and the shell are combined together by hooking, and the electric board and the base are combined together by means of pins of the electric board fitting in holes in an upper surface of the base. Then the electric board together with the base is inserted in a hollow space in the shell. Wires are connected between the electric board and connecting members on an upper surface of the shell, and other wires connect the connecting members with the power lines coming through threaded holes of the cap. Thus power current flows first to the electric board, then to the pins and then to a pin lamp fitted in the CFLH.

Another feature of the invention is the shell, which has male threads on its outer surface to engage with an outer ring, which can then be screwed up and down along the shell.

Another feature of the invention is the wires having some spare length to enable the shell easily pulled down to separate from the cap to be lowered down a little for convenience of replacing a CFL or repairing if necessary.

One more feature of the invention is the outer ring provided with a flange for supporting a lampshade.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
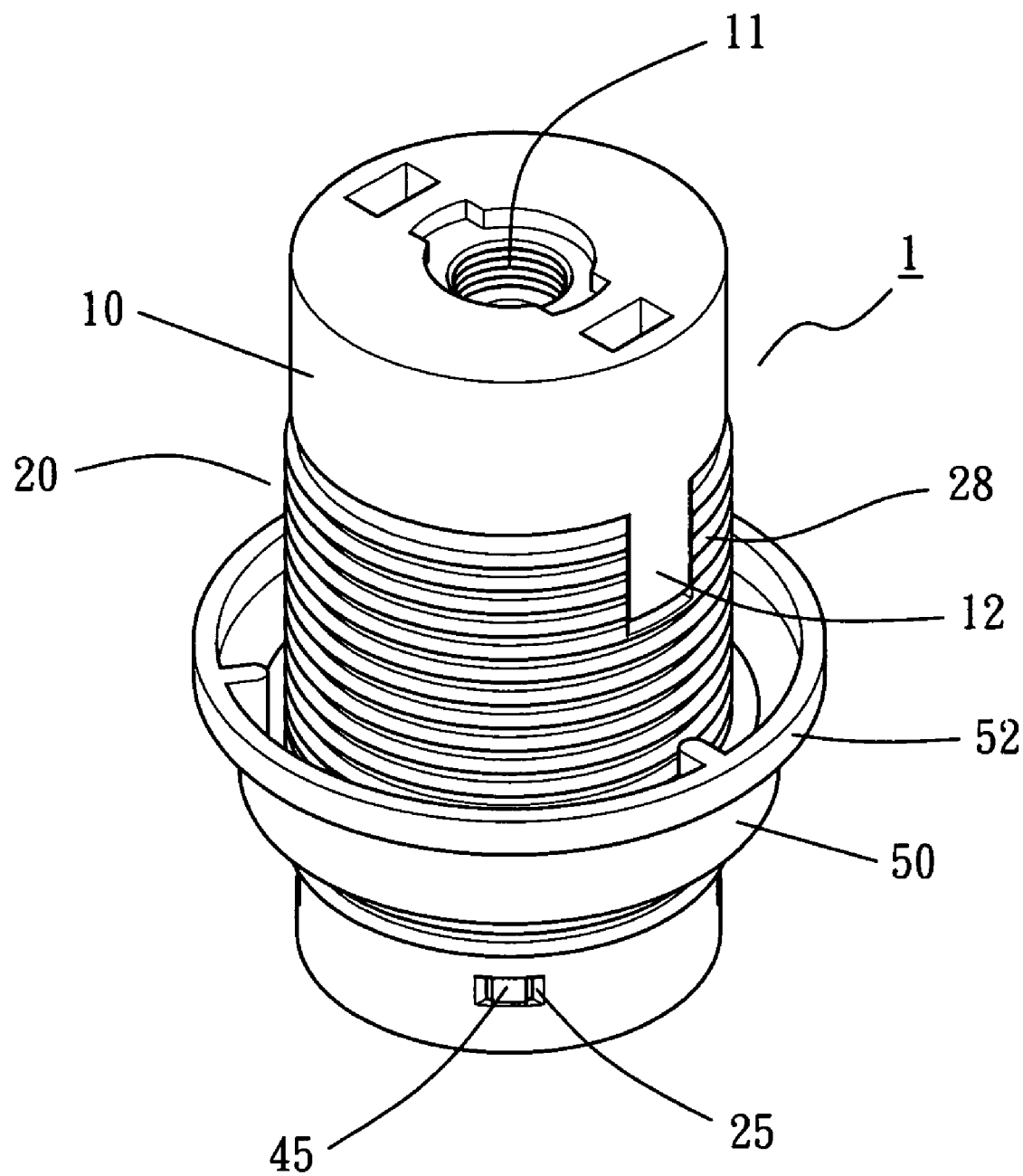
FIG. 1 is a perspective view of a CFLH in the present invention.
Figure 2:
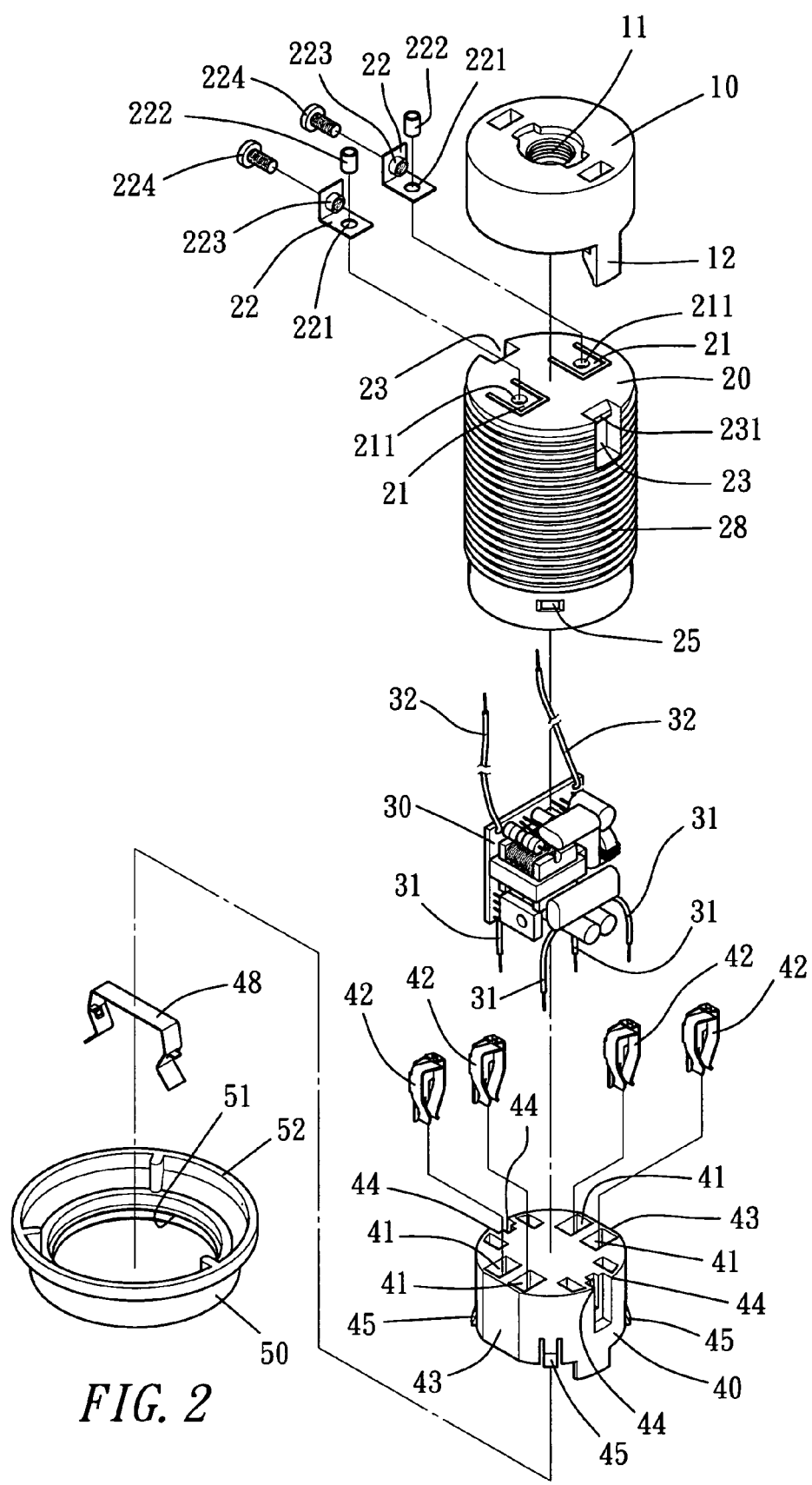
FIG. 2 is an exploded perspective view of the CFLH in the present invention.

A preferred embodiment of a CFLH in the present invention, as shown in FIGS. 1 and 2, includes a cap 10, a shell 20, an electric board 30, a base 40 and a outer ring 50 as main components combined together.

The cap 10 is shaped as a disc, provided with a female threaded hole 11 in the center, two hook arms 12 respectively extending down on two opposite sides with a hooking face located inside, a recessed space 13 formed in a lower portion and opening to the bottom.

The shell 20 is shaped as a circular post, having two U-shaped shallow grooves 21 at two sides respectively in an upper surface, a hole 211 bored in the center of each U-shaped groove 21. Then an L-shaped connecting member 22 is fitted in each shallow groove 21 with its horizontal portion located therein. Further, a hole 221 is bored in the horizontal portion of each connecting member 22, aligned to the hole 211 of the shallow groove 21 for a rivet 222 to fix therein. The connecting member 22 further has a threaded hole 223 in the vertical portion for a screw 224 to screw therein. The shell further 20 has two vertical grooves 23 formed in two opposite sides respectively and having a hook-shaped wall 231 near the top. Then the hook arms 12 of the cap 10 can respectively fit in the vertical grooves 23 of the shell 20 from above, with the hook arms 12 at first contacting the hook-shaped wall 231 and then pushed forcefully down to pass over the hook-shaped wall 231 and then recovering its original positions to be hooked by the hook-shaped walls 231. Then the cap 10 has its bottom resting closely on the upper surface of the shell 20, hiding the connecting members 22. The shell 20 further has a hollow space 24 formed in a lower portion and opening to the bottom, plural (preferably four) holes 25 spaced apart in the annular wall near the bottom opening, two flat surfaces 26 formed oppositely in an inner annular wall, and two position ridges 27 symmetrically formed on the inner annular wall a little downward from the bottom opening.

The electric board 30 is a printed circuit board inserted with plural electronic components, performing voltage transforming, wave filtering, and current rectifying for satisfying conditions for starting a CFL. The electric board 30 has four pins 31 extending down and two wires 32 extending upward.

The base 40 is shaped as a block, having four holes 41 spaced apart regularly in an upper surface for four clamps to fit therein, two symmetrical guide surfaces 43 on an outer surface, two pairs of vertical opposite surfaces 44 extending down from the upper surface and defining respectively a vertical groove, and four hooks 45 formed spaced apart around the bottom circumference.

Then the four pins 31 can fit respectively in the clamps 42 inserted in the holes 41 of the base 40, so the electric board 30 can rest closely on the base 40. In this position, the wires 32 can be preset a little longer, tacked in the hollow space 24 of the shell 20, with their top ends connected with the rivets 222 preferably by means of welding. Next, the base 40 assembled together with the electric board 30 is inserted in the hollow space 24 of the shell 20, with the flat guide surfaces 43 moving along the flat guide surfaces 26 of the shell 20 until the four hooks 45 respectively fit in the related holes 25 of the shell 20. Then the two pairs of the opposite surfaces 44 fit tightly with the position ridges 27, so the base 40 fits stably in the bottom opening of the shell 20, with the electric board 30 hidden in the hollow space 24 of the shell 20.

Figure 3:
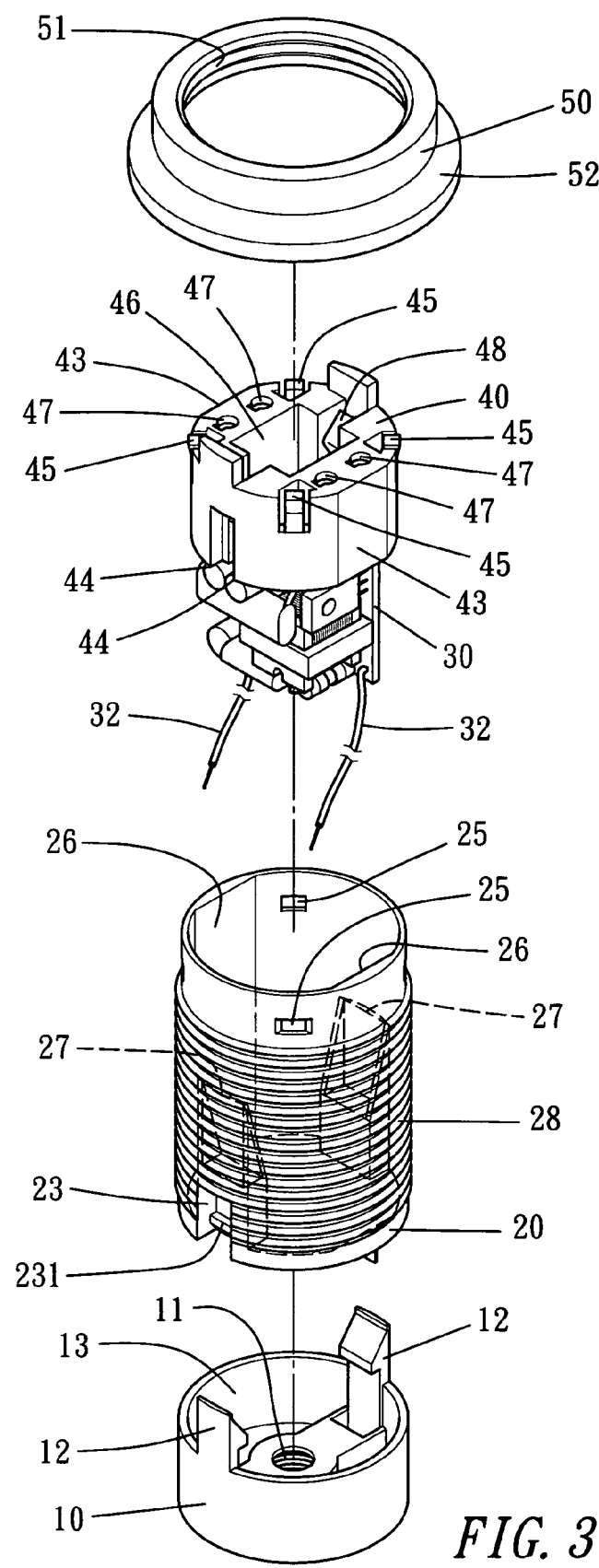
FIG. 3 is a bottom exploded perspective view of the CFLH in the present invention.
Figure 4:
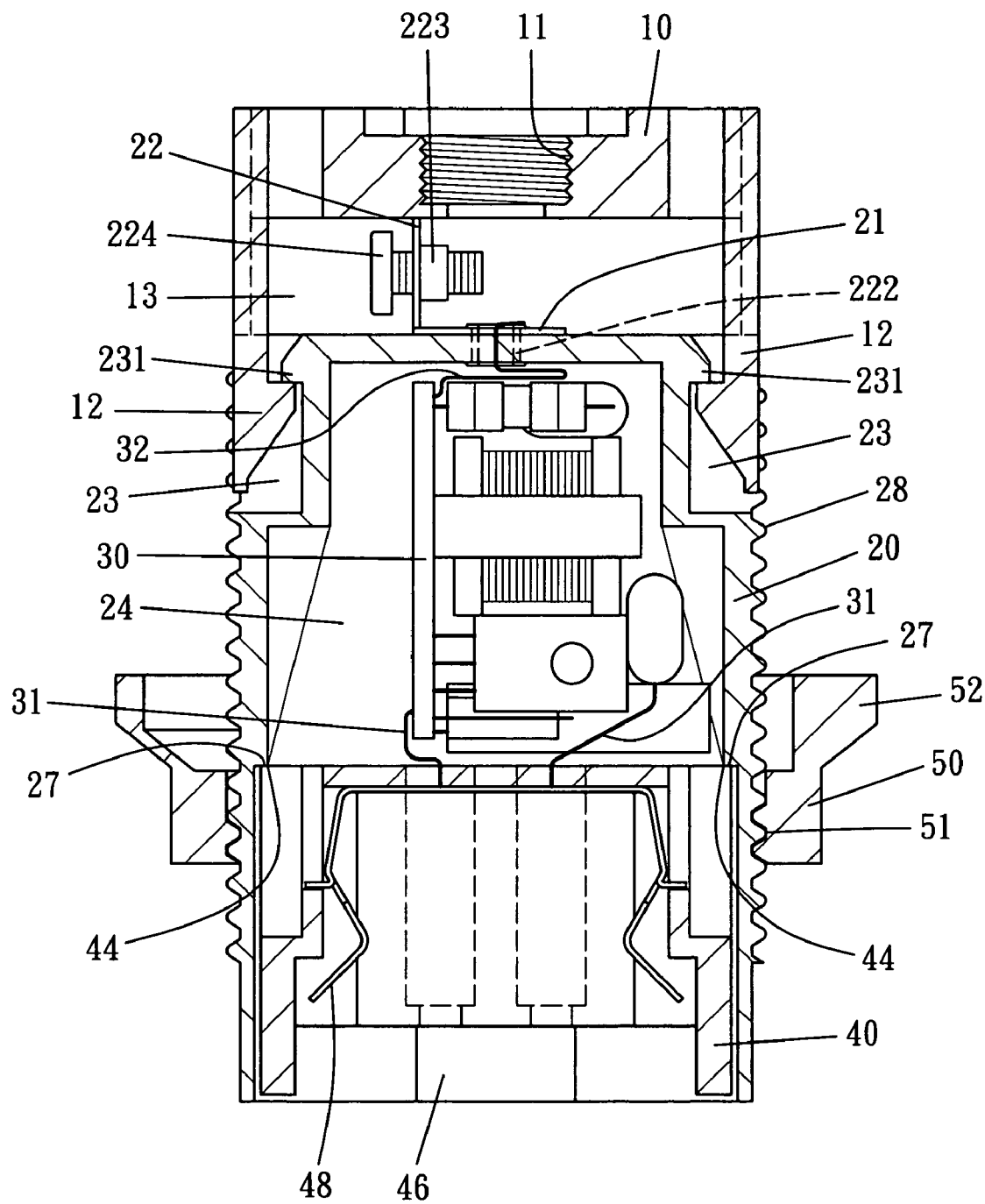
FIG. 4 is a cross-sectional view of the CFLH in the present invention.
Figure 5:
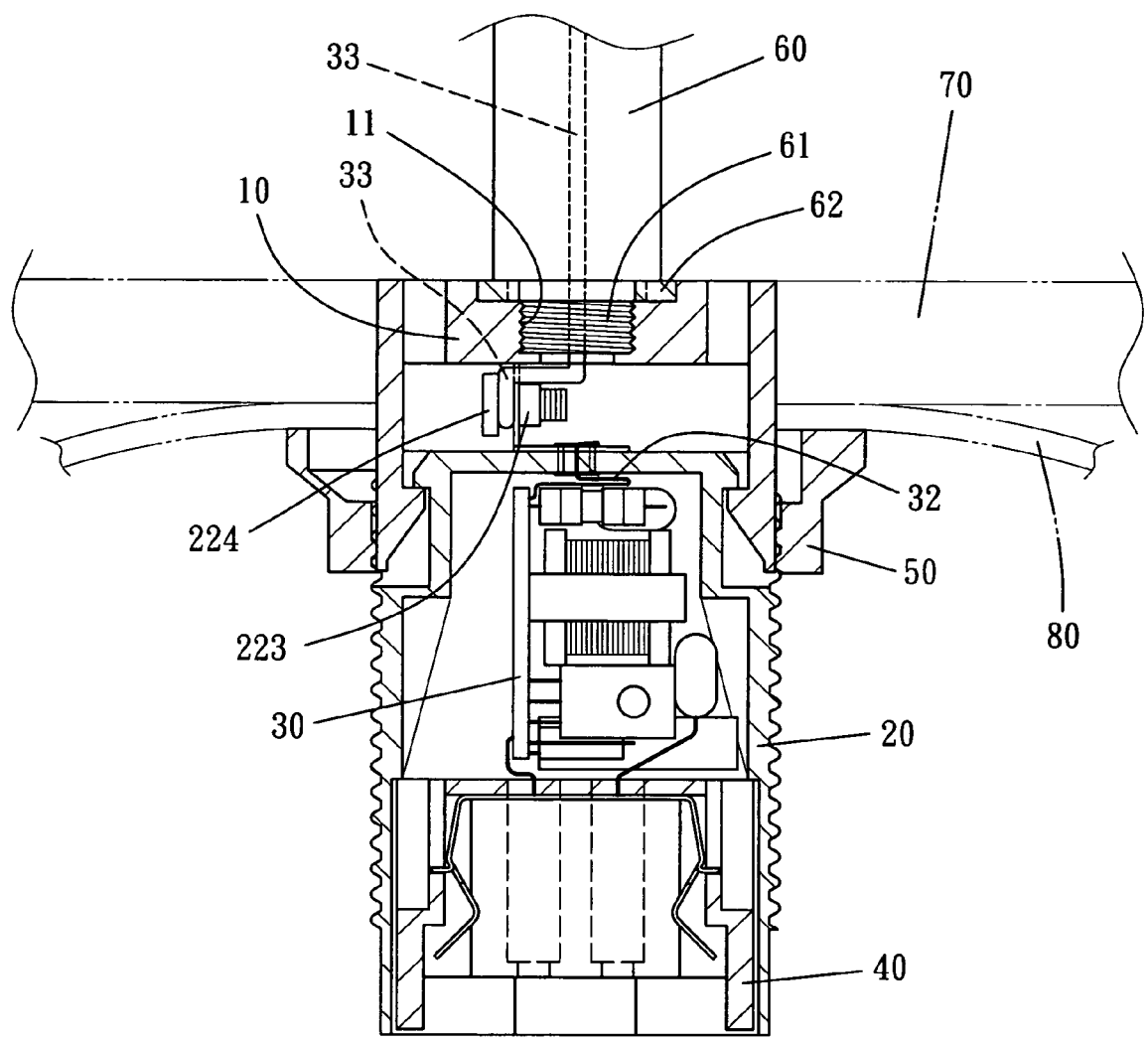
FIG. 5 is a cross-sectional view of the CFLH fixed on a location for use in the present invention.

Next, the base 40 further has an insert hollow 46 formed in a lower center portion and opening to the bottom, as shown in FIG. 3, two insert holes 47 respectively at two opposite sides of the insert hollow 46 for the lower ends of the clamps 42 to fit therein, and a CFL clamping projection 48 formed at one side of the insert hollow 46. As the lower ends of the clamps 42 can also clamp, so when a CFL (not shown) has its bottom base inserted in a hollow space 46 of the base 40, projecting blocks at two sides of the bottom base may be clamped by the CFL clamping projection 48, with the four guide posts on the bottom base respectively inserted in the insert holes 47 as well, and also clamped by the lower ends of the clamps 42. Therefore, electric current of the electric board 30 can flow through the pins 31, the clamps 42 and the four guide posts of the bottom base of the CFL to light up the CFL.

Moreover, the shell 20 further has male threads 28 on the outer surface, and the outer ring 50 has female threads 51 and a flange 52 formed preferably around the upper portion. The female threads 51 engage the male threads 28, permitting the outer ring 50 screwed to move up and down along the shell 20.

Thus, the CFLH in the invention makes use of the female threads 11 of the cap 10 to engage male threads 61 of the lower portion of a tubular member 60 for fixing it at a special needed location, with a washer 62 preferably added between the tubular member 60 and the female threads 11. Thus, the cap 10 can be fixed in a hole in a faceplate 70 such as a ceiling plate, and the tubular member 60 is actually hidden inside the faceplate 70. And wires 33 can be made to extend through the tubular member 60, then the ends of the wires 33 can be fixed around the screws 224 of the connecting members 22, which screw tightly with the threaded holes 223 to let power transmittable to the connecting members 22. Then power can be transmitted through the connecting members 22 to the rivets 222, the wires 32, and the electronic components on the electric board 30 for performing voltage transforming, wave filtering and current rectifying, if necessary.

So far, the shell 20, the electric board 30 and the base 40 are already assembled together, with the hooks 45 fitting in the holes 25 of the shell 20 and with the surfaces 44 fitting with the position ridges 27, the wires 33 and 32 have substantive spare length preset, possible to extend for a certain length so that the shell 20 can be lowered its position for conveniently insert a CFL in the socket, and then the shell 20 can be pushed back upward to the cap 10, with the hook-shaped wall 231 accurately hooking with the hook arms 12, finishing fixing the socket 1 at that location. In addition, a lampshade 80 can be fitted around the outer circumference of the cap 10, and the outer ring 50 is rotated to move upward to let its flange 52 tightly push the lampshade 80 between the faceplate 70 and the ring 50. Thus the lampshade 80 can be added to the socket 1.

In making maintenance or repair to the socket 1 or replacing an old CFL with a new one, a user may at first rise up to a certain height, and insert a tool for plying open the hook arms 12, which have some elasticity. Then the shell 20 may separate from the cap 10 and fall, with the wires 33 extending, so the user can easily carry out work for checking or replacing a CFL, and then the shell 20 can be again placed back to the original position.

While the preferred embodiment of the invention has been described above, it will be recognized and understood that various modifications may be made therein and the appended claims are intended to cover all such modifications that may fall within the spirit and scope of the invention.

I claim:

1. A compact fluorescent lamp holder (CFL) comprising:
   a cap having a center with a female threaded hole therein for receiving wires to pass through, a bottom having hook arms respectively formed thereon to extend downward from two opposite sides of the bottom, each of the hook arms having a hooking surface located in an inner side, and an opening formed in an interior of the cap having an open bottom;
   a shell comprising two connecting members on an upper surface for connecting wires, two vertical connecting grooves extending down respectively from two opposite sides of an upper surface of the shell, each said vertical connecting groove having a hook-shaped wall formed near the top, said hook arms respectively fitting in said vertical connecting grooves and having said hooking surfaces hooking with said hook-shapes walls and a bottom surface of said cap resting closely on an upper surface of said shell, said connecting members being covered by said cap, said shell further having an open bottom and a hollow space commincating with said open bottom in an interior, said shell further having plural fitting holes in an annular wall near said open bottom and two symmetrical flat walls formed in an inner annular wall, said shell further having two symmetrical position ridges formed at a location in said inner annular wall;
   an electric board formed with a printed electric board having a plurality of electronic components positioned thereon, a plurality of pins fixed to said electric board and extended downwardly therefrom, and two wires extending upward from said electric board and connected with said connecting members of said shell;
   a base having an upper surface with a plurality of holes therein, a plurality of conductive clamps being positioned respectively in the holes said pins of said electric board being inserted and clamped by said clamps so as to combine said electric board with said base, said base further having two symmetrical flat guide surfaces formed on an outer surface and two pairs of opposite surfaces extending downward symmetrically from an upper surface and respectively defining a vertical groove, said base further having plural hooks spaced apart and extending downward from an outer circumference of a bottom of the base, said base further having an insert groove formed in the bottom and a CFL clamping projection formed at one side of said groove and small insert holes respectively in two sides of said insert groove; and,
   said electric board positioned on said base initially and being inserted in said hollow space of said shell by means of said flat guide surfaces of said base moving along said flat guide surfaces of said shell until said hooks of said base hook respectively in said fitting holes of said shell, said opposite surfaces of said base then hooking stably with said position ridges of said shell to let said base stably fit in said bottom opening of said shell.

2. The compact fluorescent lampholder as claimed in claim 1, wherein said shell has male threads on an outer surface to engage with female threads formed in an outer ring, so said outer ring may be threadably rotated to move up and down along said shell.

3. The compact fluorescent lampholder as claimed in claim 2, wherein said outer ring is provided with a flange for tightly pushing a lampshade between a faceplate and the ring a lampshade.

* * * * *